(12) United States Patent
Ryham (10) Patent No.: US 6,306,252 B1
(45) Date of Patent: Oct. 23, 2001

(54) HEAT RECOVERY FROM SPENT DIGESTER COOKING LIQUOR

(75) Inventor: Rolf C. Ryham, Suwanee, GA (US)

(73) Assignee: Andritz-Ahlstrom Inc., Glens Falls, NY (US)

( * ) Notice: Subject to any disclaimer, the term of this patent is extended or adjusted under 35 U.S.C. 154(b) by 0 days.

(21) Appl. No.: 08/420,730

(22) Filed: Apr. 10, 1995

(51) Int. Cl.$^7$ .................................................. D21C 11/06
(52) U.S. Cl. .......................... 162/47; 162/239; 162/250
(58) Field of Search .............................. 162/47, 239, 250

(56) References Cited

U.S. PATENT DOCUMENTS

| | | | |
|---|---|---|---|
| 2,029,360 | * | 2/1936 | Dean ........................................ 162/47 |
| 3,414,038 | | 12/1968 | Laakso ..................................... 159/17 |
| 3,432,402 | | 3/1969 | Herrlinger et al. ..................... 203/37 |
| 3,641,784 | * | 2/1972 | Schlichtig ............................... 62/476 |
| 4,231,842 | * | 11/1980 | Ojala ........................................ 162/47 |
| 4,808,264 | * | 2/1989 | Kignell .................................. 162/30.1 |
| 4,897,157 | * | 1/1990 | Elmore et al. ....................... 162/240 |
| 5,256,255 | * | 10/1993 | Fagerlund ............................ 162/237 |
| 5,277,759 | * | 1/1994 | Sannholm .............................. 162/16 |
| 5,302,247 | * | 4/1994 | Richardsen et al. .................. 162/42 |

OTHER PUBLICATIONS

Perry Handbook, "Chemical Engineer Handbook", 5$^{th}$ Edition, pp 11–34 to 11–35.*

* cited by examiner

*Primary Examiner*—Dean T. Nguyen
(74) *Attorney, Agent, or Firm*—Nixon & Vanderhye P.C.

(57) ABSTRACT

Steam (preferably clean steam) having less noncondensible gases than steam produced by conventional black liquor flashing is produced from hot black liquor from a digester of a pulp mill. A heat exchanger is utilized and the hot black liquor is passed through the heat exchanger in heat exchange contact with an evaporable liquid, preferably clean water. After the water is heated in the heat exchanger it is flashed in at least one flash tank where the heat exchanger is a liquid-to-liquid heat exchanger. The heat exchanger may alternatively include an evaporator (such as a falling film evaporator) in which case the black liquor is passed through an inductor before it enters the evaporator. Alternatively, the heat exchanger may be one or more boilers, such as kettle boilers, in which case the black liquor preferably passes through a cooler after the boilers. Heat energy and turpentine recovery are also maximized.

8 Claims, 5 Drawing Sheets

HEAT RECOVERY FROM SPENT DIGESTER COOKING LIQUOR

BACKGROUND AND SUMMARY OF THE INVENTION

In the chemical pulping of cellulosic fibrous material, after the active cooking chemicals are consumed, the cooking liquor is typically recycled to recover as much reusable chemicals and energy as possible. For example, in both continuous and batch kraft digesters, spent cooking liquor, that is, black liquor, is typically removed from the digester and directed to evaporators to increase the solids concentration of the liquor and recover water. The concentrated liquor is then fired in a recovery boiler to remove the remaining moisture and produce sodium salts from which cooking liquor, that is, white or green liquor, can be produced to be used for digestion.

Instead of sending the used liquor to recovery, the hot, pressurized black liquor removed from the digester may be used to treat chips prior to the formal cooking process. For example, as disclosed in copending applications "Continuous Kraft Cooking with Black Liquor Treatment", Ser. No. 08/299,103, filed Sep. 2, 1994 now abandoned and "Kraft Cooking with Spent Liquor Pretreatment of Chips", Ser. No. 08/345,822, filed Nov. 21, 1994 now abandoned. Hot black liquor may be recirculated sequentially to pretreat wood chips during the impregnation stage. In a batch process, black liquor removed from the digesters may be stored at different temperatures in black liquor "accumulators" for reuse in pretreating chips.

Also, the hot, pressurized black liquor may be allowed to expand under controlled conditions, i.e., "flashed", to produce a source of steam and to reduce the moisture content of the liquor. The steam so produced can be used elsewhere in the pulping process. For example, flashed steam can be used directly to presteam chips prior to cooking.

The above flashing process, though it has been successfully employed in conventional continuous digesters, has the drawback that the steam produced contains volatile compounds, including sulfur compounds, which are undesirable in the presteaming of wood chips. Typically, wood chips are steamed at atmospheric pressure, or slightly above, such that the residual gases not absorbed by the wood chips must be collected and treated. Treatment typically is by combustion in a mill's noncondensible gas (NCG) system. However, this collection and treatment system becomes particularly significant when the steam used contains volatile compounds, including sulfur compounds, which have undesirable environmental impact, including noxious odor. It is therefore preferable to use a source of steam which minimizes or eliminates the introduction of volatile compounds to the steaming process.

Also, the flashing of kraft black liquor in flash tanks causes the formation of foam. The large size of conventional flash tanks is primarily due to the volume of foam that is produced and must be accommodated.

The present invention as applied to continuous or batch digesters, reduces the size and number of flash tanks and minimizes the introduction of volatile compounds to the chip steaming process. To achieve this, the invention includes a cooking liquor recovery system in which the heat energy of the extracted cooking liquor is recovered and steam produced by means of indirect heat exchangers, and one or more smaller flash tanks, or reboilers. In such reboilers, the hot, pressurized spent cooking liquor is passed in heat exchange relationship with volatile-compound-free, "clean" water to heat the water above its boiling point, or flash point. The hot water can be subsequently flashed to clean steam in one or more flash tanks to produce one or more sources of clean steam. The steam produced may be at one or more pressures and temperatures.

The system according to the invention, including the flash tanks thereof, can be at least 50% smaller than conventional steam recovery systems and may be located at ground level, whereas conventional, cascading flash tanks must be elevated.

The clean steam produced according to the invention can be used where needed in the pulp mill. For example, the clean steam can be used for presteaming wood chips. When used to treat chips, since the steam does not introduce volatile compounds to the presteaming process, the load of volatile compounds which must be collected and treated by a mill's NCG system is reduced.

The steam may also be used for indirect preheating of cooking liquors or filtrates that are used in and around a digester, for example, kraft white liquor, black liquor and washer filtrate, or sulfite or soda cooking liquors. The clean condensate produced from indirect heating of liquors can be used as needed in the mill, for example, as washer shower water or combined with other condensates.

Furthermore, since clean water does not foam, the flash tanks may be much smaller, at least approximately 50% smaller, than conventional black liquor flash tanks.

The present invention provides for a heat recovery and steam generation system which is much smaller than conventional systems and produces a clean source of steam for chip treatment and other uses.

According to one aspect of the present invention a method of producing steam having less noncondensible gases than steam produced by conventional black liquor flashing is provided. The method comprises the steps of: (a) passing hot black liquor at a temperature of about 120–165° C. from a digester through a heat exchanger; and (b) passing an evaporable liquid to be evaporated through the heat exchanger into heat exchange contact with the hot black liquor so that the evaporable liquid is evaporated to produce steam having less noncondensible gases than steam produced by conventional black liquor flashing.

Step (b) may be practiced by heating clean water as the evaporable liquid in the heat exchanger, and then flashing the heated clean water into clean steam in at least one flash tank (preferably two or more different flash tanks to produce steam at two or more different pressures), which are smaller than conventional and may be at ground level. The clean steam may be used in a bleach plant for bleaching chemical cellulose pulp, or otherwise directly brought into contact with comminuted cellulosic fiber material that is used to produce chemical cellulose pulp, such as in a chip bin, or brought into contact with a chemical cellulose pulp itself.

The heat exchanger may comprise an evaporator, such as a falling film evaporator (although other types may also be utilized), and there may be the further step of passing the black liquor through an inductor to increase the velocity thereof (preferably at least about 20%) prior to passing the black liquor into the heat exchanger (evaporator). Again, desirably clean water is passed into the heat exchanger as the evaporable liquid so that step (b) produces clean steam, and there may be the further step of recirculating some of the black liquor which is passed through the heat exchanger to the inlet to the heat exchanger to thereby reduce the temperature of the entering black liquor for more efficient heat transfer (since there is a lower temperature difference between the heat exchanging fluids). Alternatively, step (b) may be practiced by introducing some of the black liquor that is passed through the heat exchanger as the evaporable liquid (e.g. recirculating between 10–40% of the black liquor after it passes through the heat exchanger as the evaporable liquid). In this case the steam produced is not "clean" but it does have less NCG than conventional steam produced by flashing black liquor in flash tanks.

Steps (a) and (b) may be practiced utilizing at least one boiler (e.g. two boilers) as the heat exchanger, and step (b) is preferably practiced using clean water as the evaporable liquid to produce clean steam. There may also be the further step (c) of cooling the black liquor at least 5° C. (e.g. from about 105–110° C. to about 95–100° C.), and preferably about 10° C., after it passes through the at least one boiler by passing it into heat exchange relationship with the liquid. Preferably step (c) is practiced by using green liquor or white liquor as the liquid for cooling, although water may also be used where hot process water is needed at some point in the pulp mill.

According to another aspect of the present invention a steam producing system for a cellulose pulp is provided. The system comprises in the following elements: A digester having a black liquor outlet. A heat exchange means having a hot liquid inlet, a hot liquid outlet, an evaporable liquid inlet, and an evaporable fluid outlet. The black liquor outlet connected to the hot liquid inlet. And a source of evaporable liquid connected to the evaporable liquid inlet.

The heat exchange means may comprise a liquid-to-liquid heat exchanger, an evaporator, such as a falling film evaporator (although other types are also utilizable), one or more boilers, or other structures that are capable of ultimately producing steam. The source of evaporable liquid preferably comprises clean water. The system—especially where liquid-to-liquid heat exchangers are utilized—preferably includes at least one flash tank substantially at ground level connected to the evaporable fluid outlet for flashing the evaporable liquid into steam (after the evaporable liquid has been heated by the heat exchanger).

The system may also further comprise an inductor connected between the black liquor outlet and the heat exchange means, particularly where the heat exchange means comprises an evaporator. The inductor increases the speed of the black liquor (e.g. at least about 20%). The system may also further comprise means for recirculating about 10–40% of the black liquor from the hot liquid outlet to the hot liquid inlet (again to make the heat transfer more efficient). Where the heat exchange means comprises at least one boiler, there typically is further a cooler connected to the hot liquid outlet, and to which green liquor, white liquor, or water to be heated passes to cool the black liquor at least about 5° C. while simultaneously heating the cooling liquid.

Since the invention recovers energy from liquor by means of liquid-to-liquid heat exchangers, it is also more energy efficient than conventional flashing systems. By transferring heat from a hot liquor stream to a cooler liquid stream, a higher level of energy (temperature) can be transferred to the cooler liquid and then used where needed. The flashing of liquor as is conventional limits the heat recovered to the temperature of the flashed steam. That temperature is dependent upon the pressure present during flashing and is lower than the original liquor temperature. The invention is not so limited and thus has improved heat transferability compared to the conventional methods.

Further, the invention can recover more turpentine than is recovered with conventional flashing systems. Turpentine is conventionally recovered from either digester relief steam or flashed liquor steam. However, when flashed black liquor steam is used to preheat (that is presteam) wood chips, the turpentine (or its source material, terpenes) when reintroduced to the cooking process can be destroyed. By not reintroducing terpene-laden steam to the cooking process, more turpentine can be recovered.

According to this aspect of the present invention, a method of recovering maximum heat energy from hot spent digester cooking liquor is provided. The method comprises the steps of: (a) Passing hot spent digester cooking liquor in liquid-to-liquid heat exchange relationship with a clean evaporable liquid so that the temperature of the clean evaporable liquid is raised above its evaporation temperature. (b) Expanding the heated clean evaporable liquid under controlled conditions to produce a clean source of steam. And (c) treating comminuted cellulosic fibrous material with the clean steam from step (b) prior to introduction into a digester from which the hot spent digester cooking liquor is withdrawn as the spent liquor used in step (a). The clean evaporable liquid is typically water, but in some situations it can instead be a cooking or wash filtrate liquid. In that case the method comprises the steps of: (a) Passing hot spent digester cooking liquor in liquid-to-liquid heat exchange relationship with a liquor that can be used to treat comminuted cellulosic fibrous material in a digester so that the temperature of the liquid is raised; and (b) using the heated liquid in the digester to cook the comminuted cellulosic fibrous material. The liquid is heated preferably comprises cooking liquor or wash filtrate, the cooking liquor may be kraft white liquor, black liquor, green liquor, sulfite cooking liquor, or soda cooking liquor.

It is the primary object of the present invention to provide an improved method and system for producing cleaner steam, preferably clean steam from black liquor, to thereby achieve numerous advantages including reducing the load of volatile compounds which must be collected and treated in a pulp mill NCG system, improving heat recovery, and improving turpentine recovery. This and other objects of the invention will become clear from an inspection of the detailed description of the invention, and from the appended claims.

DETAILED DESCRIPTION OF THE DRAWINGS

Figure 1:
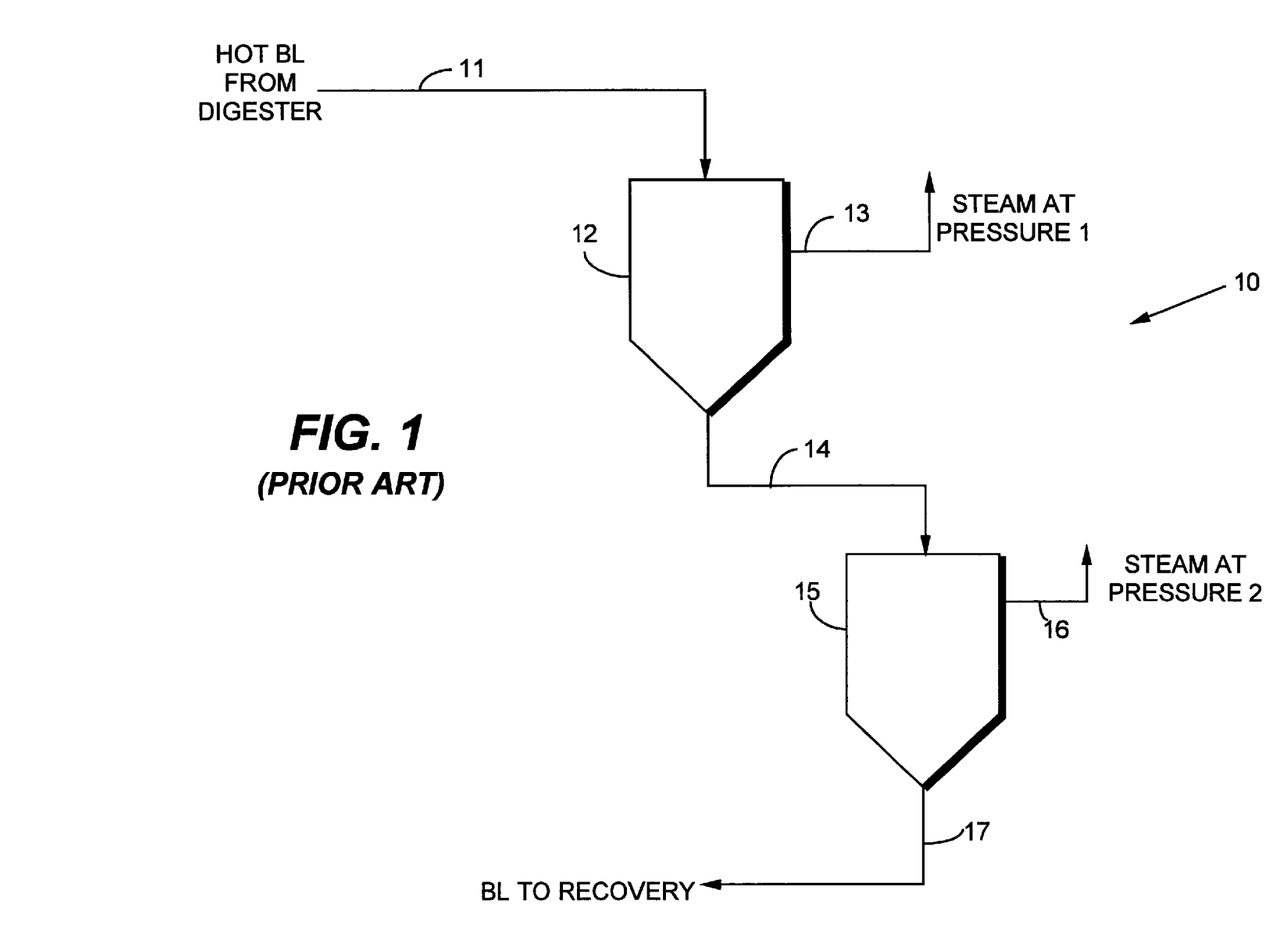
FIG. 1 is a schematic view of the conventional prior art system for flashing black liquor from a digester into steam.

FIG. 1 is an illustration of a typical present, prior art system 10 of recovering steam from hot waste liquor, e.g., kraft black liquor, from a continuous or batch digester. Hot black liquor in line 11 is flashed in a first flash tank 12 to produce a first source of steam 13 and a cooled black liquor in line 14. The liquor is further flashed in a second flash tank 15 to yield a second source of steam 16 and an even cooler liquor in line 17. The somewhat cooler liquor in line 17 with reduced water content is sent to a conventional recovery system to recover further heat and chemicals.

Figure 2:
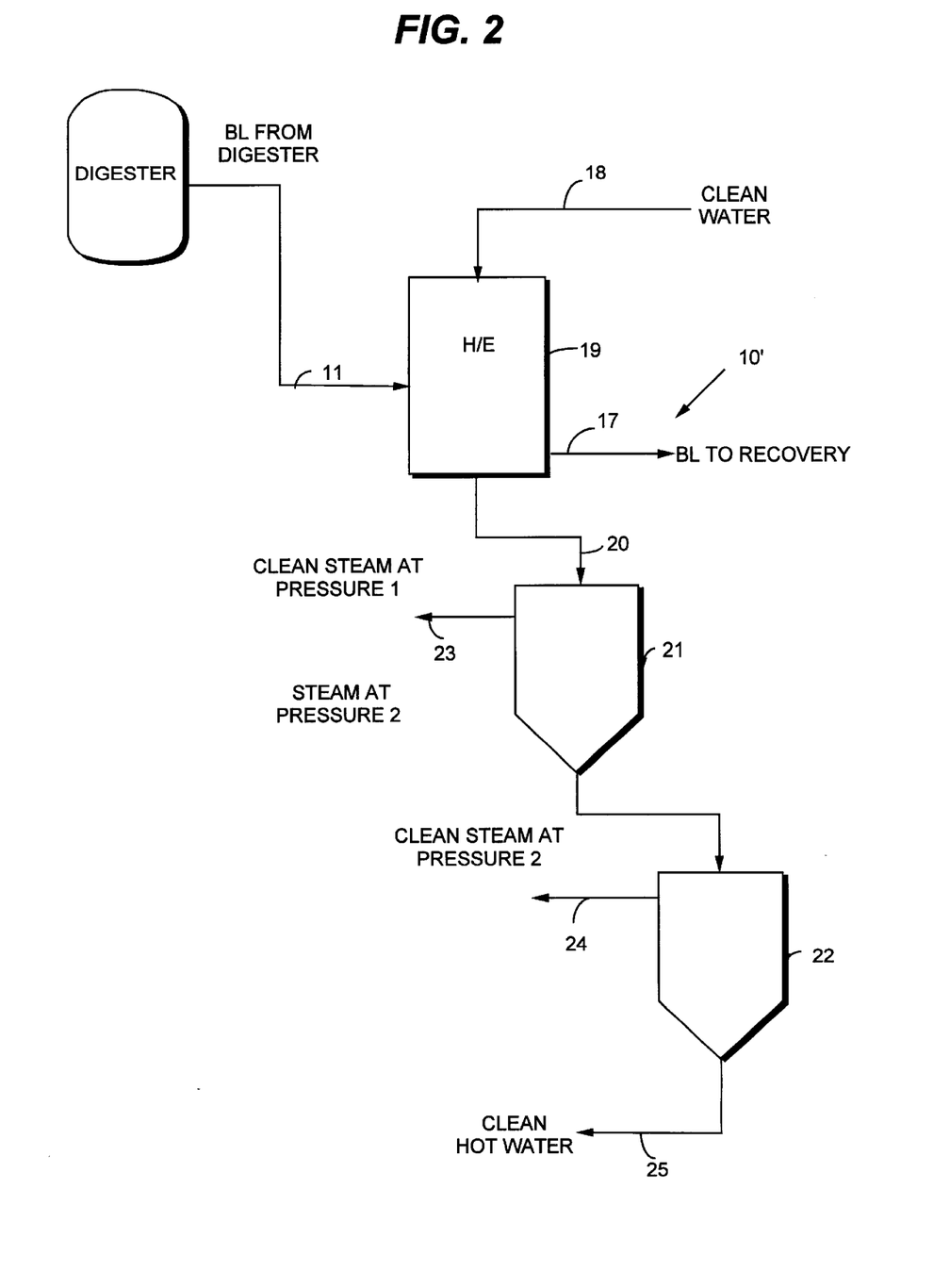
FIG. 2 is a view like that of FIG. 1 only showing a system according to the present invention.

FIG. 2 schematically illustrates one embodiment of a system of the present invention. In FIG. 2, black liquor in line 11 from a digester is passed in heat-transfer relationship with a clean source of water 18 in a heat exchanger (H/E) 19. This source of water may be any available "clean" water source in the pulp mill, including evaporator condensate. The heated clean water in line 20 is then flashed in a series of flash tanks 21, 22 to produce two sources of steam 23, 24 and a source of hot water 25.

The flash tanks 21, 22 may be markedly different in design than the conventional tanks 12, 15 shown in FIG. 1. Since the clean hot water flashed in 21, 22 will not generate foam, the tanks 21, 22 may be significantly smaller than conventional tanks, for example, at least 50% smaller, and they may be at ground level. The construction may also be quite different.

Although FIG. 2 shows a single heat exchanger 19 two or more heat exchangers may be used to provide multiple sources of hot water. Each of these heat exchangers 19 may be attached to one or more flash tanks 21, 22. Also each heat exchanger 19 may include a recirculation of heated water to the clean water inlet 18 to control the temperature drop across the heat exchanger 19 and improve the efficiency of heat transfer. The heat exchangers 19 are preferably liquid-to-liquid heat exchangers. It will thus be seen that the system 10' includes a black liquor outlet from the digester. It is also seen that the heat exchange means 19 has a hot liquid inlet (connected to line 11), a hot liquid outlet (line 17), an evaporable liquid (e.g. clean water) inlet connected to line 18, and an evaporable fluid outlet connected to line 20, in the case of the FIG. 2 embodiment, the fluid in line 20 being heated water which is subsequently flashed into steam in the flash tanks 21, 22. Thus, hot black liquor at a temperature of about 120–165° C. is passed from the digester in line 11 through the heat exchanger 19, and the evaporable liquid (clean water) in line 18 passes through the heat exchanger 19 into heat exchange contact with the hot black liquor so that the evaporable liquid is evaporated (ultimately in flash tank 21) to produce steam having less noncondensible gases than steam produced by conventional black liquor flashing (in FIG. 1), and in the case of the system of FIG. 2 clean steam at two different pressures being produced, as well as clean hot water from line 25.

Figure 3:
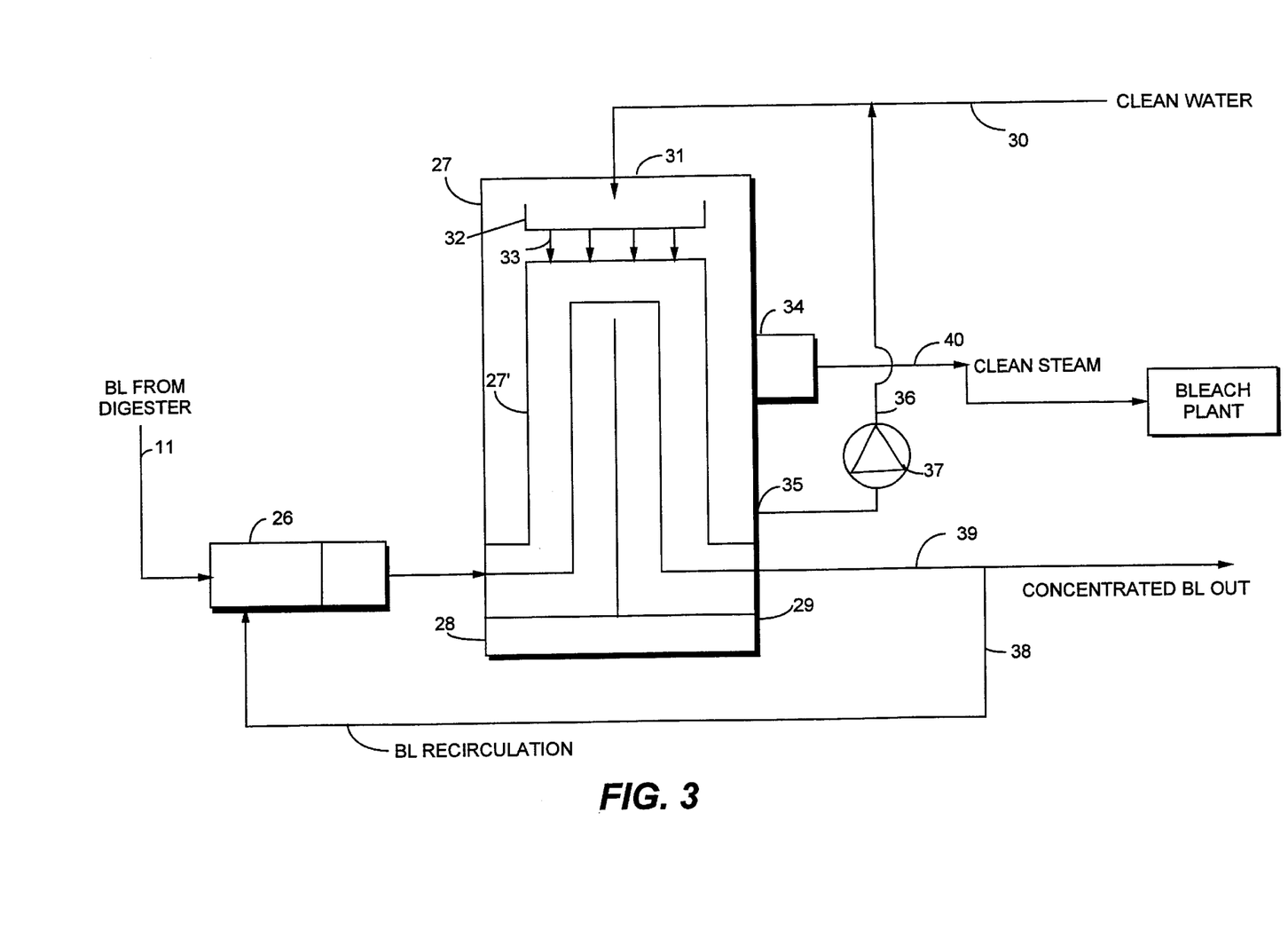
FIG. 3 is a schematic view of another embodiment of an exemplary system according to the present invention which utilizes an evaporator for the production of clean steam from hot black liquor.

Another embodiment of this invention appears in FIG. 3. In this embodiment, hot black liquor 11 from a digester at 120–160° C. and 125–175 psi enters an inductor 26 before entering an evaporator 27. The conventional inductor increases the velocity of the liquor (e.g. at least 20%) to produce a desired high liquor flow inside the heat transfer elements 27' in the evaporator 27. The evaporator 27 is preferably a falling film evaporator containing a plurality of heat transfer elements 27' and comprises the heat exchange means.

The black liquor enters the inlet 28 of the evaporator 27 and typically passes through the inside of the heat transfer element 27' and exits at outlet 29. At the same time, clean water in line 30 enters the top of the evaporators 31 and is fed to a distribution box 32. The distribution box 32 is typically an open plenum with a perforated base. The distribution box 32 creates a plurality of streams of clean water 33 which fall onto the exterior surfaces of the heat transfer elements 27'. The clean water is heated by the hot black liquor passing through the inside of the elements 27' to create clean steam which is removed via steam outlet 34. The unevaporated, heated water falls to the bottom of the evaporator 27 and is removed via outlet 35. This hot water is recirculated at 36 to the inlet of the evaporator 31 by means of recirculation pump 37. This recirculated water raises the temperature of the incoming clean water. Some of this hot water 36 may be used where needed in the pulp mill.

The concentrated black liquor leaving the outlet 29 may be recirculated through line 38, back to the inductor 26, to reduce the temperature of the liquor entering the evaporator. The recirculation of black liquor 38 and the recirculation of hot water 36 reduces the temperature difference across the heat transfer elements so that a more efficient transfer of heat can be obtained. High temperature differences can cause undesirable, non-uniform transfer of heat between the black liquor and water and reduce the efficiency of the process.

The concentrated, somewhat cooler, black liquor produced in line 39 may be sent to recovery, used to pretreat wood chips in the digester, used as a source of heat in one or more additional evaporators to obtain additional clean steam, flashed to produce a source of unclean steam, or used where needed in the fiberline.

The clean steam 40 may be used where needed in the fiberline, including the bleach plant. Preferably this steam can be used to steam wood chips prior to impregnation and cooking. Using this clean steam to steam chips eliminates a conventional source of noncondensible gases (NCGs).

Figure 4:
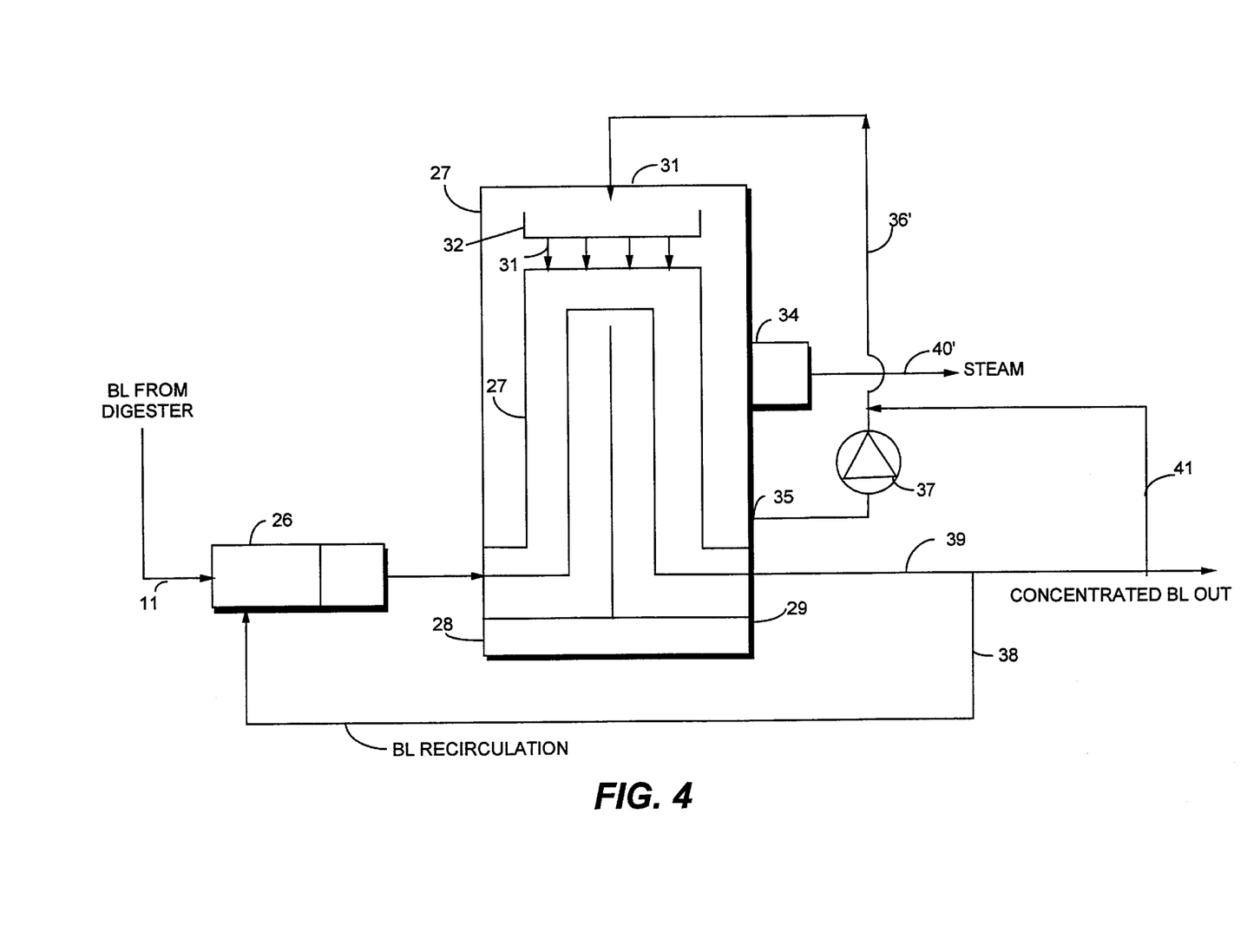
FIG. 4 is a view like that of FIG. 3 except that black liquor is used as the liquid to be evaporated.

A further embodiment of this invention is shown in FIG. 4. The system shown in FIG. 4 is similar to that shown in FIG. 3, however, the system in FIG. 4 does not heat clean water to obtain steam, but black liquor. Almost all of the components in FIG. 4 are identical to those in FIG. 3 and are identified with the same reference numerals. Some of the concentrated BL in line 39 is recirculated in line 41 to the recirculation line 36. This recirculated BL becomes the medium which is evaporated to produce steam 40'. For example 10 to 40% of the concentrated black liquor in line 39 can be recirculated via line 41. This steam, however, is not clean, but contains much less of the noncondensible gases (NCGs) produced in conventional black liquor flashing.

Figure 5:
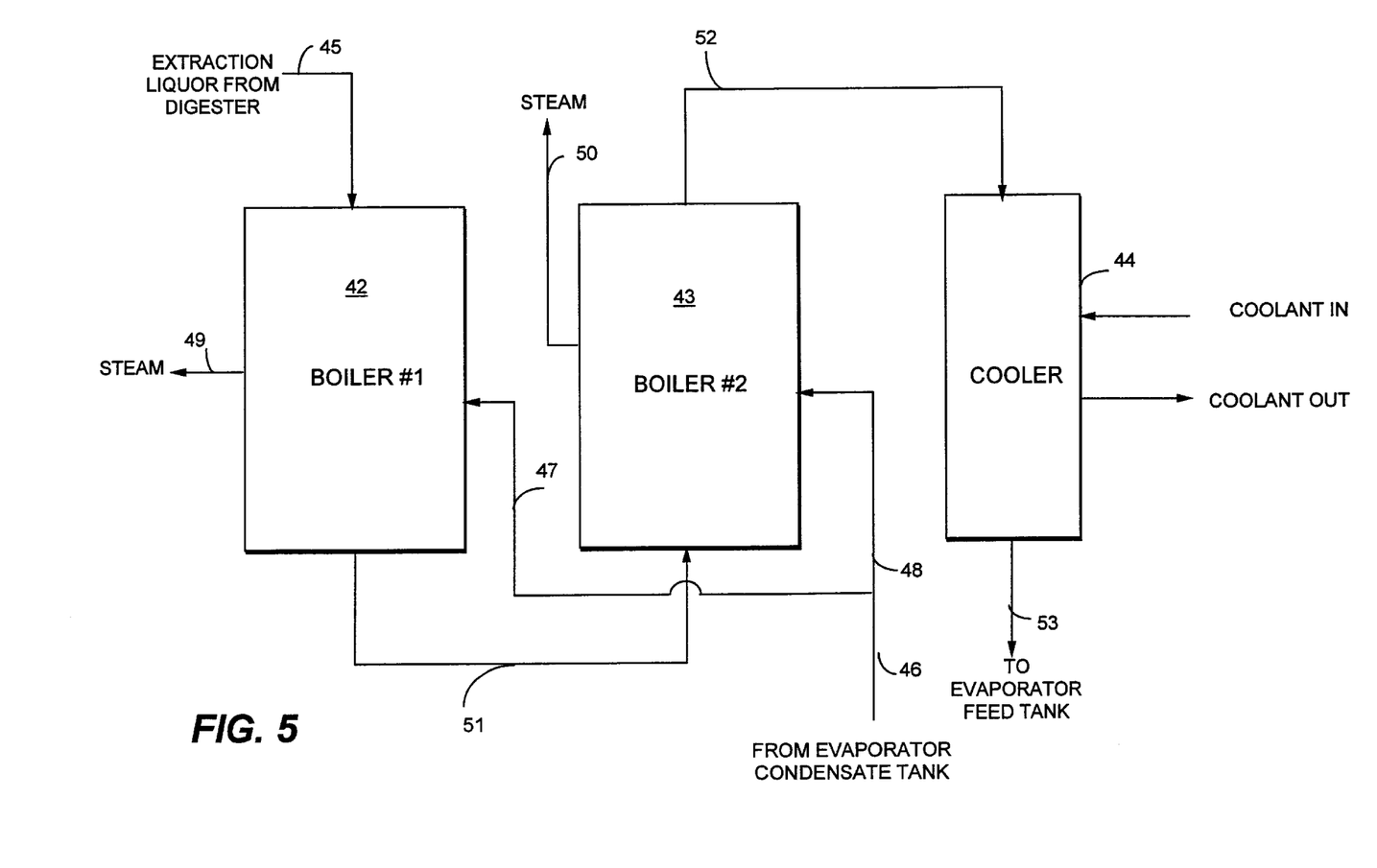
FIG. 5 is a schematic view of still another embodiment according to the present invention.

A further embodiment of this invention is shown in FIG. 5. This figure shows a heat and material balance for two boilers 42, 43 and a conventional liquor cooler 44. The boilers 42, 43 may be any conventional boiler, for example, a kettle boiler, and comprise the heat exchange means.

In the example shown in FIG. 5, black liquor in line 45 from a continuous digester, at a rate of 634 Tons/hour and 158° C., passes through the two boilers 42, 43. (One or more boilers may be used, but for this system two sources of steam were preferred.) Evaporator condensate in line 46 at 50 T/h and 60–70° C., is used as a source of "clean" water which is boiled in the boilers. The condensate is shown flowing in parallel to the boilers though the condensate may also flow in series through the boilers.

In this example, the condensate is split essentially evenly between the two boilers. The first condensate stream 47 is boiled in boiler 42 to produce steam in line 49 at 120–125° C. The second condensate stream 48 is heated in boiler 43 to produce steam in line 50 at 102–105° C. The liquor in boiler 42 is cooled to around 130–135° C. and is used as the heating medium 51 in boiler 43. The cooled liquor exits boiler 43 at approximately 105–110° C., 52, and is further cooled in cooler 44 to 95–100° C. The cooled black liquor exiting the cooler 53 is sent to conventional recovery, for example, to the evaporator feed tank. The coolant in cooler 44 may be any available liquid source that is preferably heated, for example, water, white liquor, black liquor, or green liquor.

The "clean" sources of steam 49, 50, as discussed previously, may be used for steaming wood chips entering the feed system, for example, in a chip bin or steaming vessel. This steam may also be used for indirect heating of, for example, cooking liquors or washer filtrates.

It will thus be seen that according to the present invention an advantageous method and system are provided for producing clean steam from hot black liquor from a digester in a pulp mill. The steam produced according to the present invention has less NCG than steam produced from conventional flashing of black liquor, and preferably comprises clean steam that may be brought into direct contact with cellulose pulp or comminuted cellulosic material (wood chips). Where flash tanks are used, the size of the flash tanks may be at least 50% smaller than the conventional black liquor flash tanks that they replace and may be at ground level, and the total amount of volatile compounds which must be collected and treated in a mill's NCG system is reduced. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and systems.

What is claimed is:

1. A method of producing steam having less sulfur-containing noncondensible gases than steam produced by flashing black liquor, including sulphur compounds, directly into steam, comprising the steps of:
    (a) passing hot black liquor, including sulphur compounds, at a temperature of about 120–165° C. from a digester through a heat exchanger;
    (b) passing an evaporable liquid to be evaporated through the heat exchanger into heat exchange contact with the hot black liquor so that the evaporable liquid is heated so that it is ultimately evaporated to produce steam having less sulfur-containing noncondensible gases than steam produced by flashing black liquor, including sulphur compounds, directly into steam, and
    wherein step (b) is practiced by heating clean water as the evaporable liquid in the heat exchanger, and then flashing the heated clean water into clean steam in at least one flash tank.

2. A method as in claim 1 wherein step (b) is practiced in two different flash tanks to produce steam at two different pressures.

3. A method as in claim 1 comprising the further step of using the clean steam in a bleach plant for bleaching chemical cellulose pulp.

4. A method of maximizing the energy recovery from hot spent digester cooking liquor comprising the steps of: (a) passing hot spent digester cooking liquor in liquid-to-liquid heat exchange relationship with a clean evaporable liquid so that the temperature of the clean evaporable liquid is raised above its evaporation temperature; (b) expanding the heated clean evaporable liquid under controlled conditions to produce a clean source of steam having less sulfur-containing noncondensible gases than steam produced by flashing black liquor, including sulphur compounds, directly into steam; (c) treating comminuted cellulosic fibrous material with the clean steam from step (b) prior to introduction into a digester from which the hot spent digester cooking liquor is withdrawn as the spent liquor used in step (a), and wherein step (b) is practiced by heating clean water as the evaporable liquid in the heat exchanger, and then flashing the heated clean water into clean steam in at least one flash tank.

5. A steam producing system for a cellulose pulp mill, comprising:
    a digester having a black liquor outlet;
    a heat exchange means having a hot liquid inlet, a hot liquid outlet, an evaporable liquid inlet, and an evaporable fluid outlet;
    said black liquor outlet connected to said hot liquid inlet;
    a source of evaporable liquid connected to said evaporable liquid inlet;
    means for producing steam from evaporable liquid introduced into said heat exchange means, and connected to said evaporable liquid outlet, and
    further comprising at least one flash tank connected to said evaporable fluid outlet, for flashing the evaporable liquid into steam; wherein said source of evaporable liquid comprises clean water, and wherein said heat exchange means comprises at least one liquid-to-liquid heat exchanger.

6. A steam producing system for a cellulose pulp mill, comprising:
    a digester having a black liquor outlet;
    a heat exchange means having a hot liquid inlet, a hot liquid outlet, an evaporable liquid inlet, and an evaporable fluid outlet;
    said black liquor outlet connected to said hot liquid inlet;
    a source of evaporable liquid connected to said evaporable liquid inlet;
    means for producing steam from evaporable liquid introduced into said heat exchange means, and connected to said evaporable liquid outlet, and
    wherein said at least one flash tank is at ground level.

7. A steam producing system for a cellulose pulp mill, comprising:
    a digester having a black liquor outlet;
    a heat exchange means having a hot liquid inlet, a hot liquid outlet, an evaporable liquid inlet, and an evaporable fluid outlet;
    said black liquor outlet connected to said hot liquid inlet;
    a source of evaporable liquid connected to said evaporable liquid inlet;
    means for producing steam from evaporable liquid introduced into said heat exchange means, and connected to said evaporable liquid outlet;
    wherein said means for producing steam comprises at least one flash tank connected to said evaporable fluid outlet, for flashing the evaporable liquid into steam;
    wherein said source of evaporable liquid comprises clean water; and wherein said heat exchange means comprises at least one liquid-to-liquid heat exchanger, and
    wherein said at least one flash tank is a retrofit to the pulp mill to replace an existing flash tank having a first size, and wherein said replacement flash tank has a size of at least about 50% smaller than the existing flash tank it replaced.

8. A steam producing system for a cellulose pulp mill, comprising:
    a digester having a black liquor outlet;
    a heat exchange means having a hot liquid inlet, a hot liquid outlet, an evaporable liquid inlet, and an evaporable fluid outlet;

said black liquor outlet connected to said hot liquid inlet;

a source of evaporable liquid connected to said evaporable liquid inlet;

means for producing steam from evaporable liquid introduced into said heat exchange means, and connected to said evaporable liquid outlet;

wherein said at least one flash tank is at ground level, and wherein said at least one flash tank is a retrofit to the pulp mill to replace an existing flash tank having a first size, and wherein said replacement flash tank has a size of at least about 50% smaller than the existing flash tank it replaced.

* * * * *